J. A. V. TURCK.
CALCULATING MACHINE.
APPLICATION FILED SEPT. 30, 1918.

1,371,954.

Patented Mar. 15, 1921.
14 SHEETS—SHEET 1.

WITNESS

INVENTOR.
BY
ATTORNEYS.

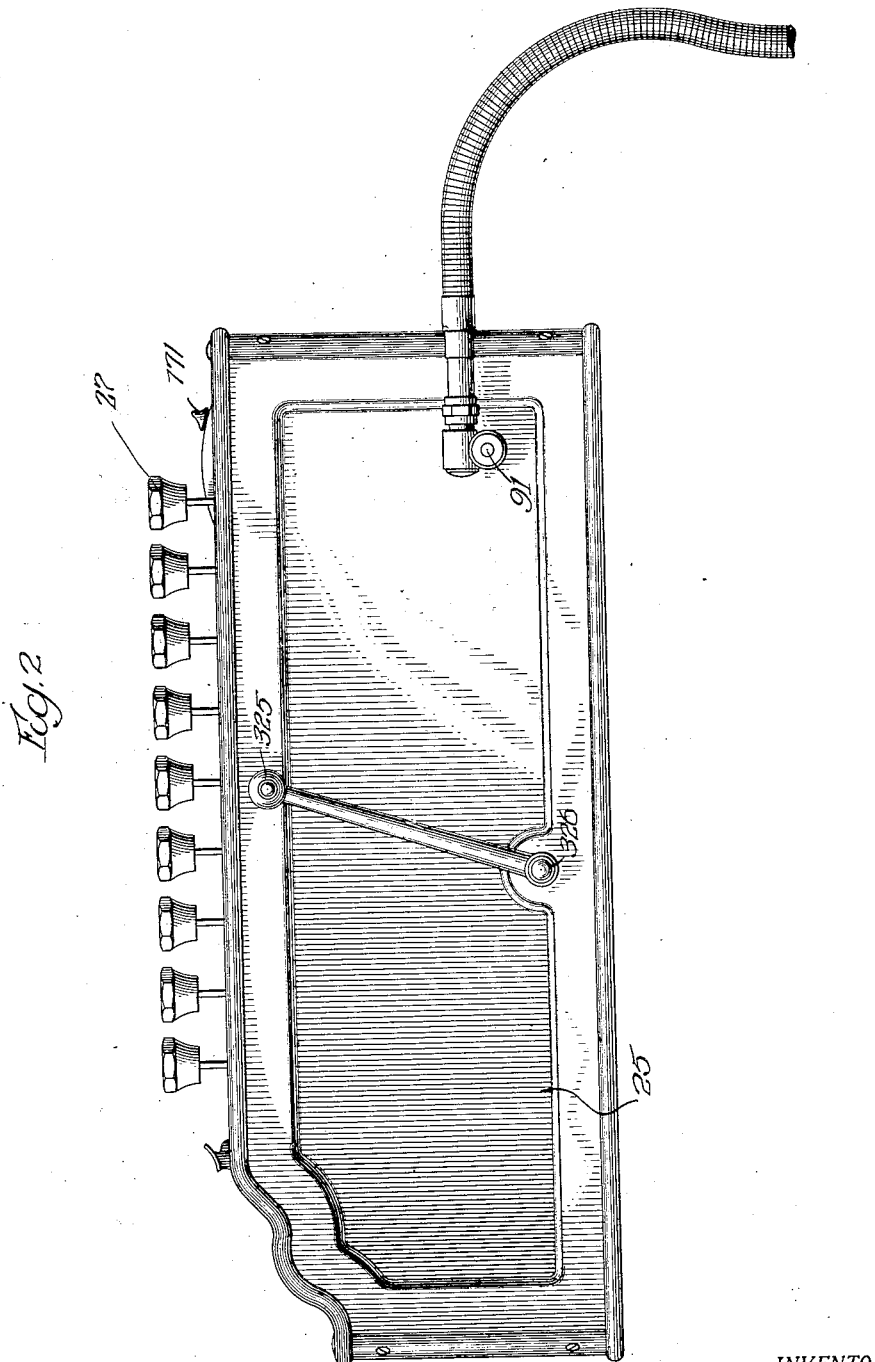

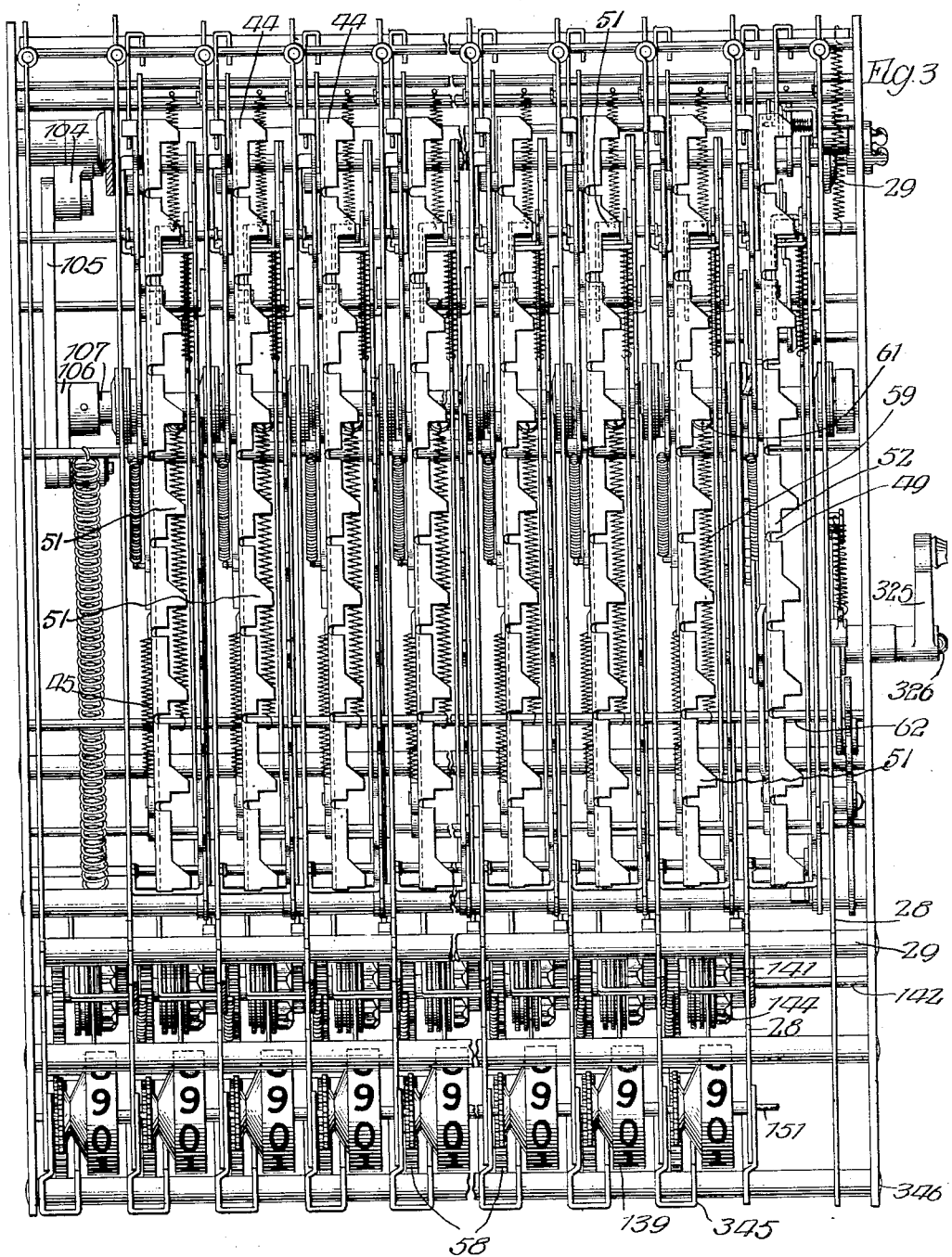

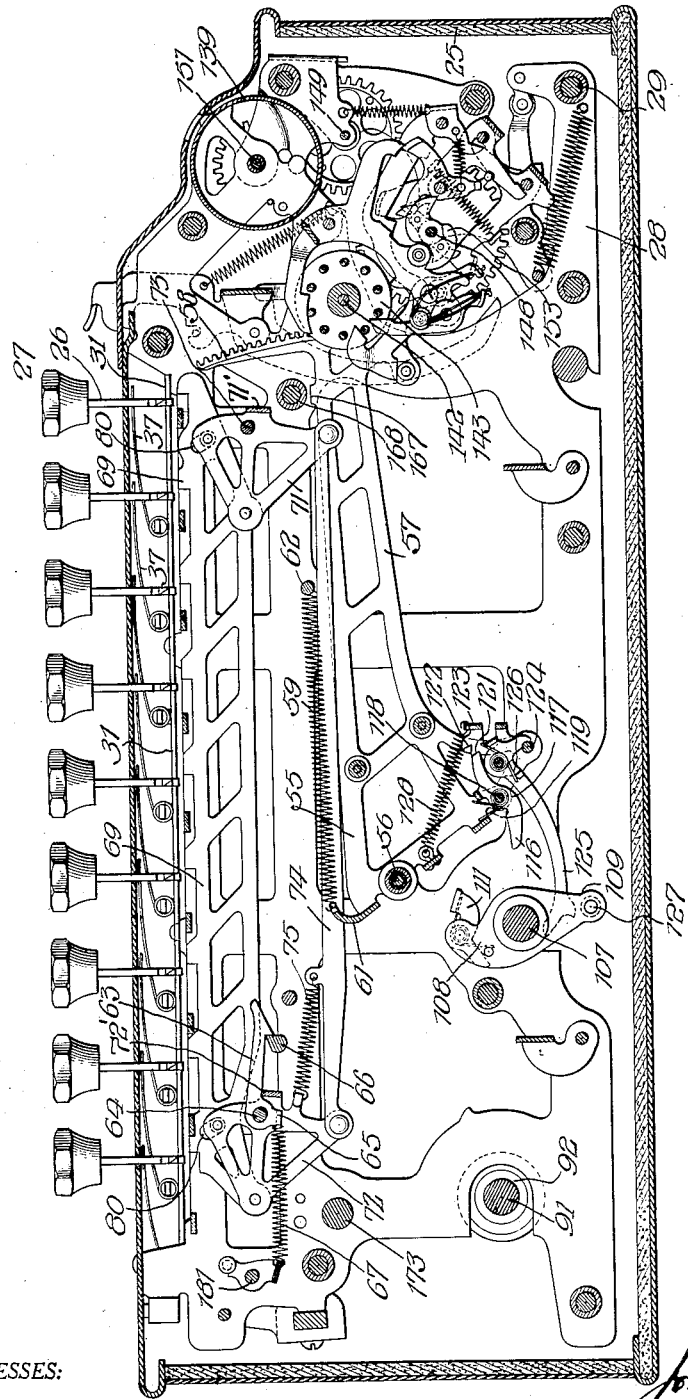

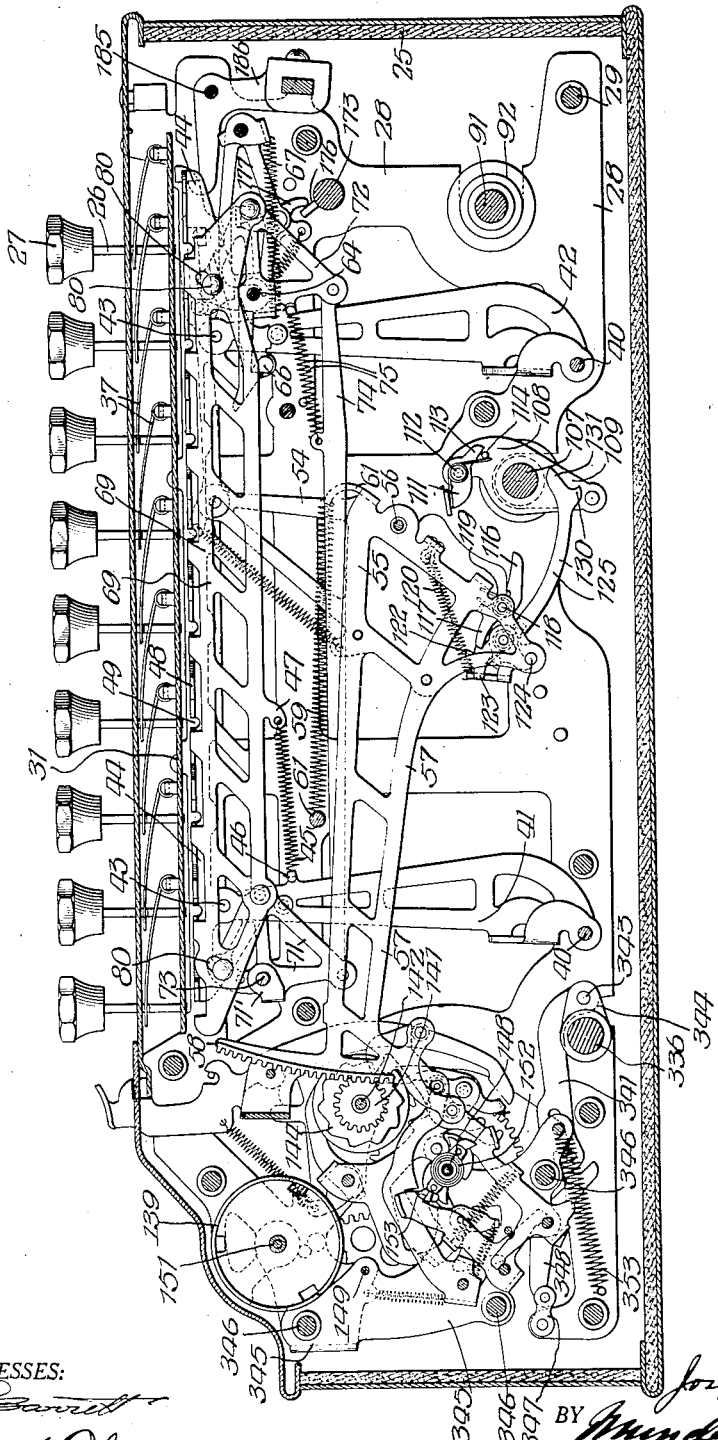

J. A. V. TURCK.
CALCULATING MACHINE.
APPLICATION FILED SEPT. 30, 1918.
1,371,954.
Patented Mar. 15, 1921.
14 SHEETS—SHEET 6.
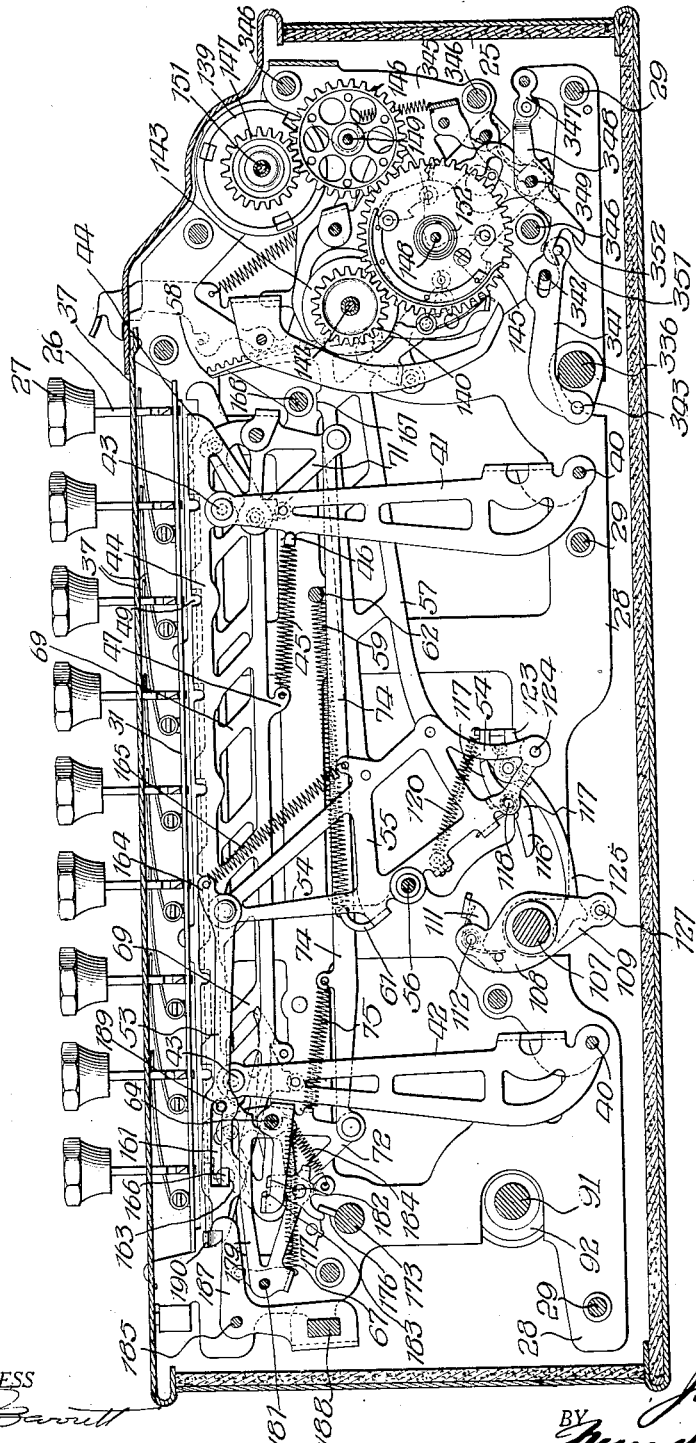

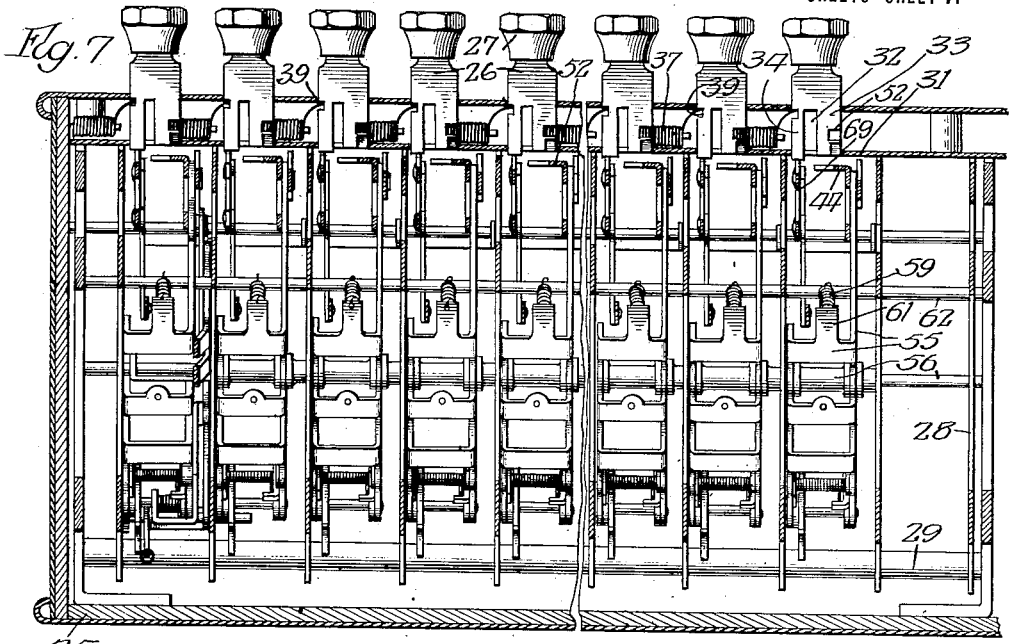
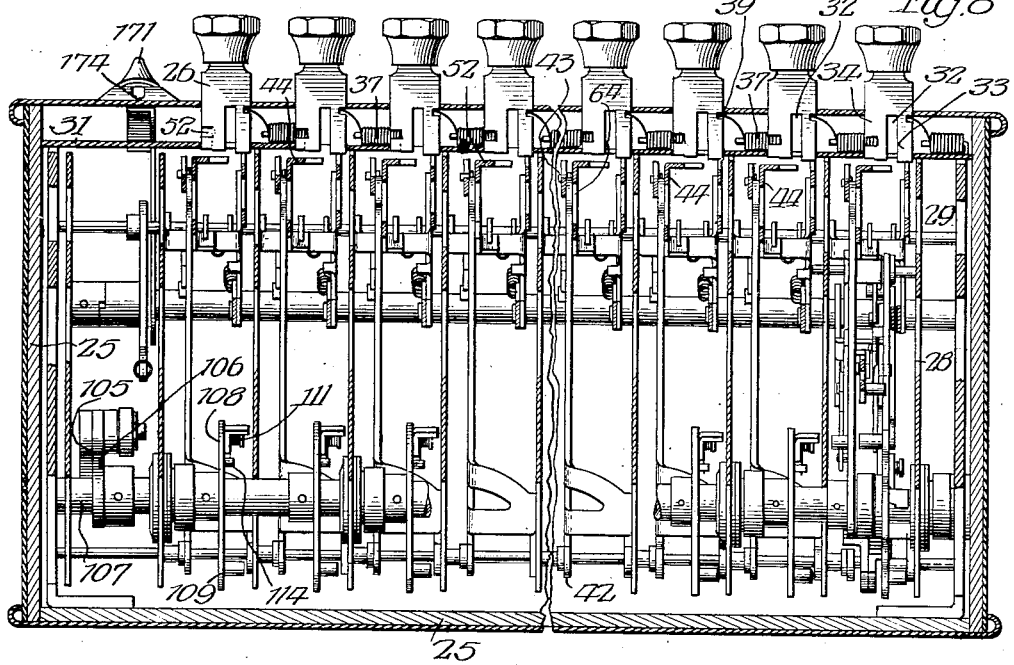

J. A. V. TURCK.
CALCULATING MACHINE.
APPLICATION FILED SEPT. 30, 1918.
1,371,954.
Patented Mar. 15, 1921.
14 SHEETS—SHEET 8.
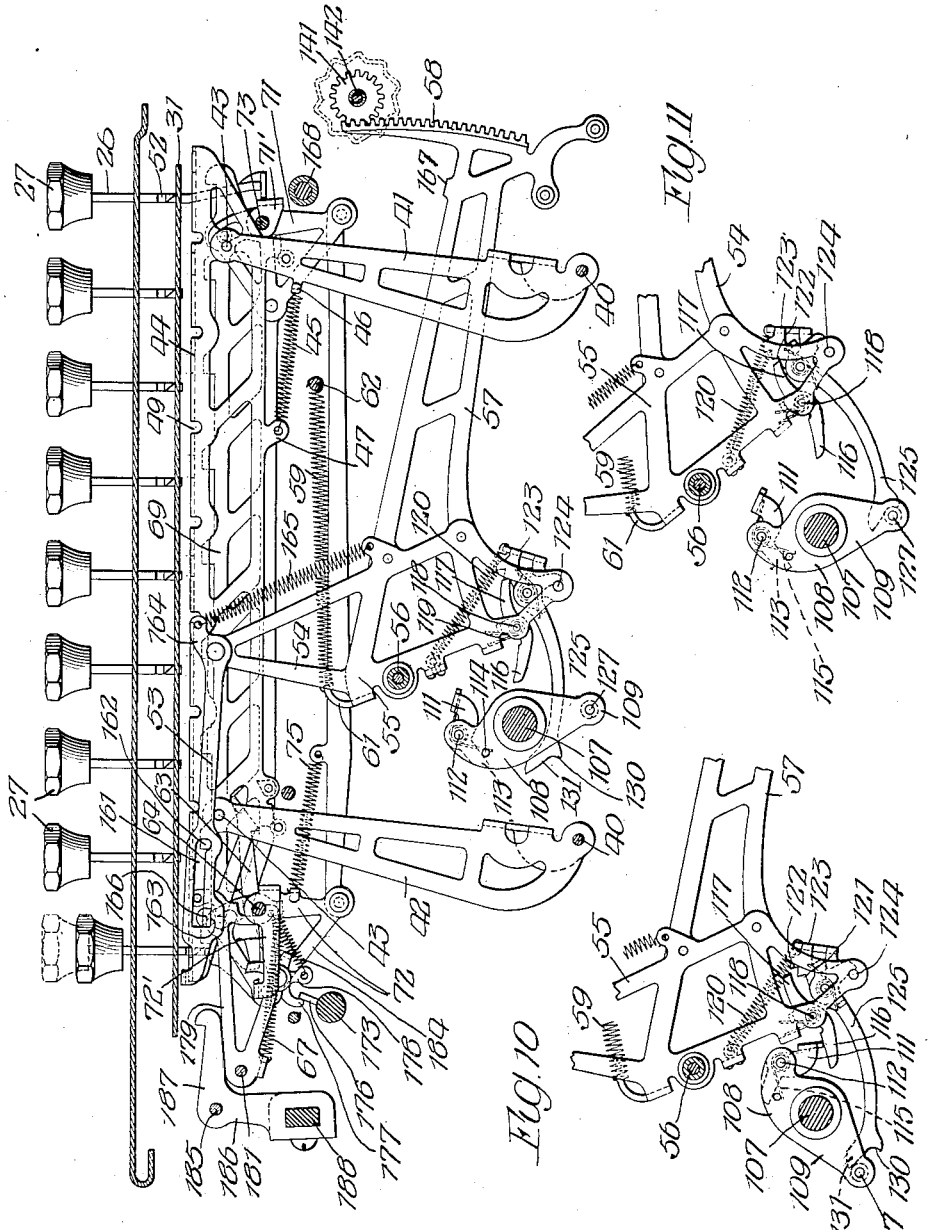
WITNESSES:
INVENTOR.
Joseph A. V. Turck
BY
Munday, Clarke
& Carpenter
ATTORNEYS.

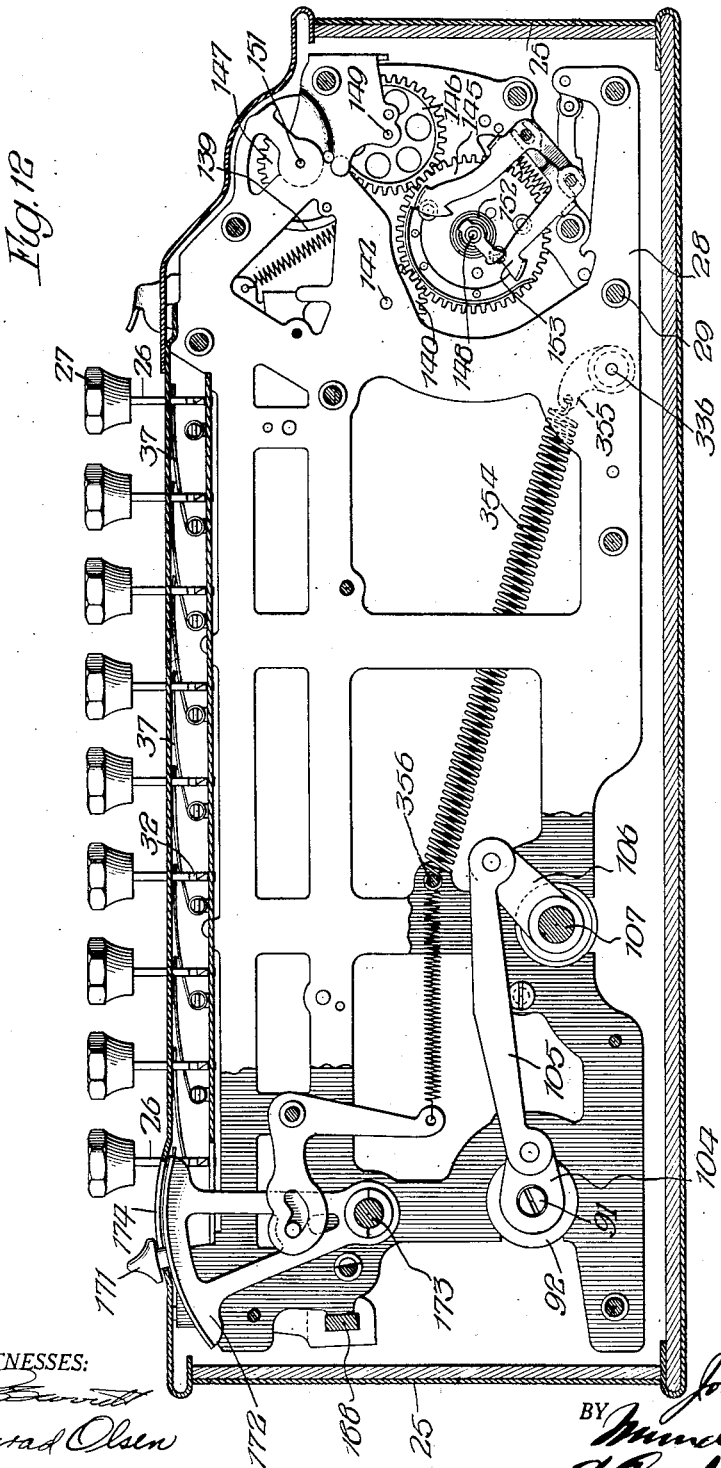

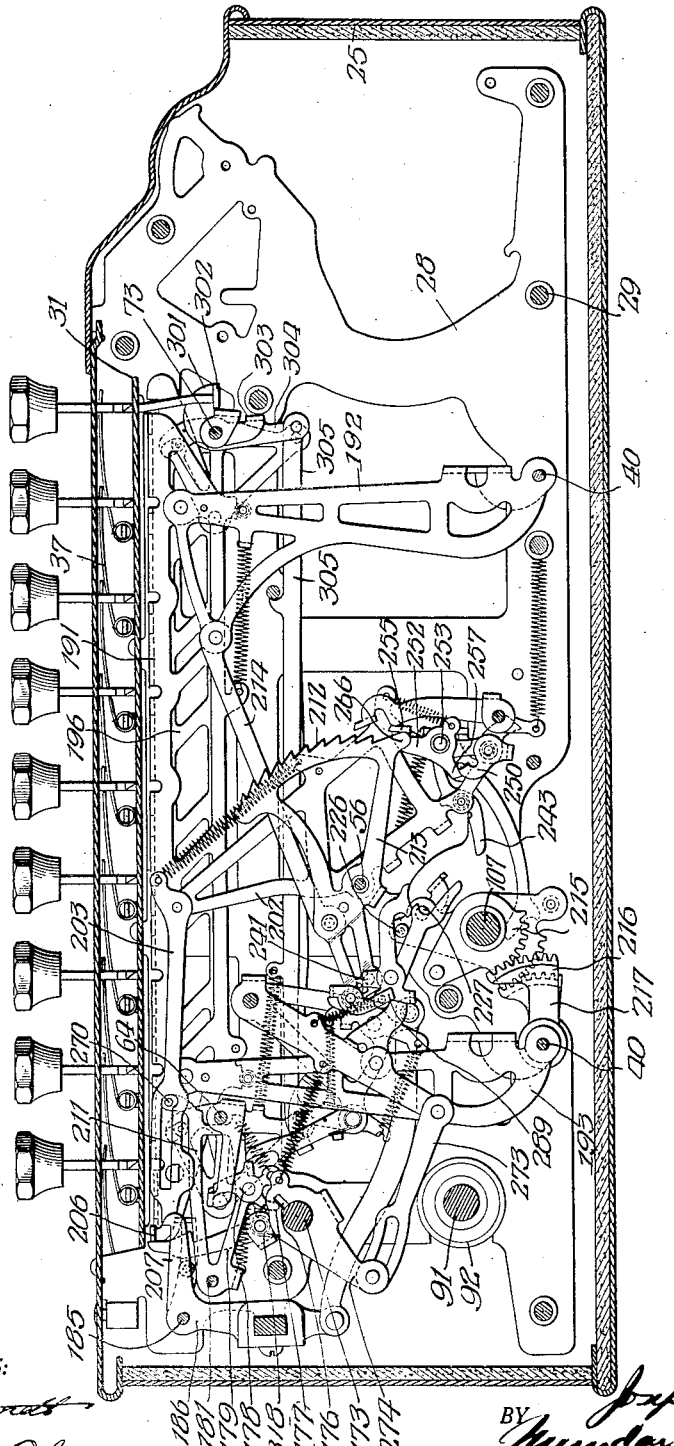

J. A. V. TURCK.
CALCULATING MACHINE.
APPLICATION FILED SEPT. 30, 1918.
1,371,954.
Patented Mar. 15, 1921.
14 SHEETS—SHEET 11.
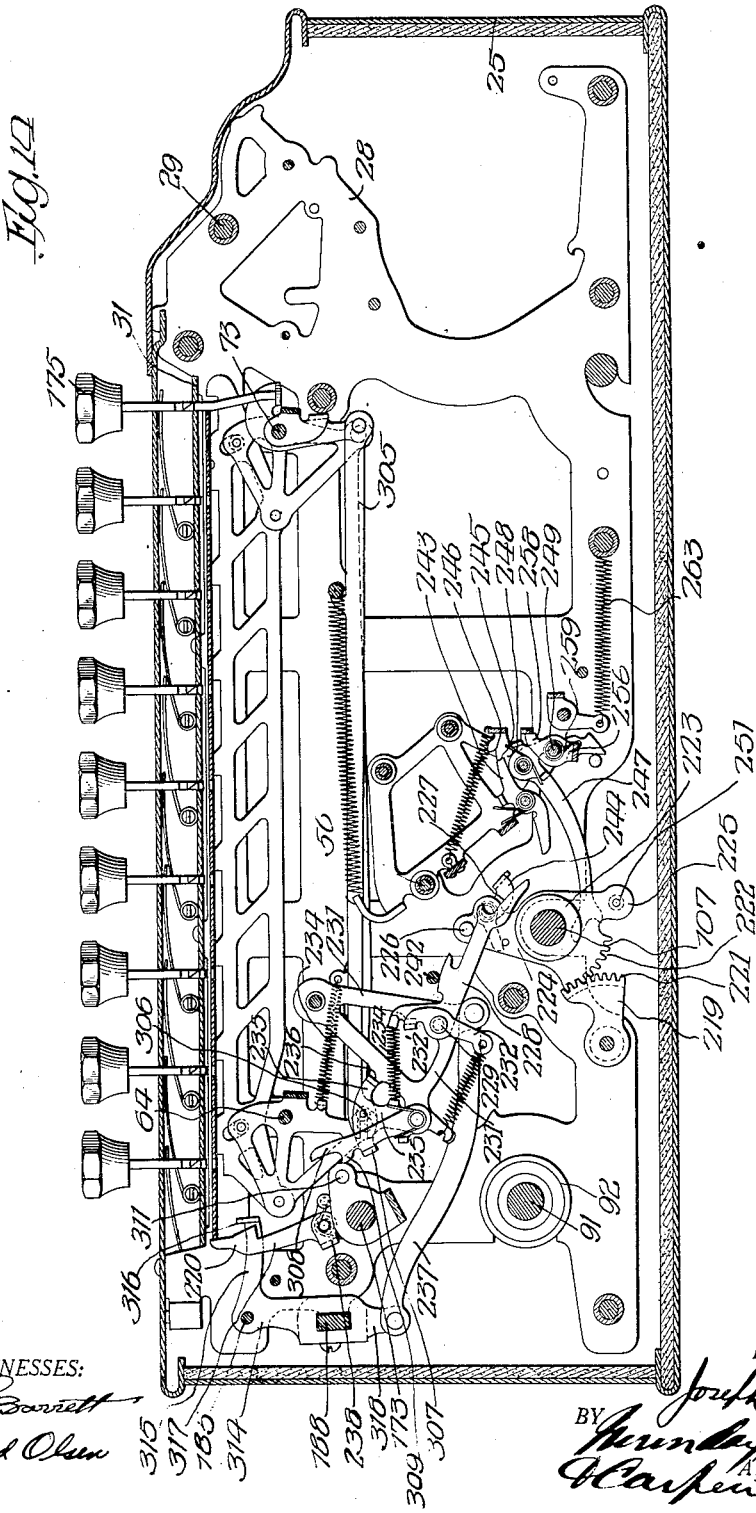
WITNESSES:
INVENTOR.
BY
ATTORNEYS.

J. A. V. TURCK.
CALCULATING MACHINE.
APPLICATION FILED SEPT. 30, 1918.
1,371,954.
Patented Mar. 15, 1921.
14 SHEETS—SHEET 12.
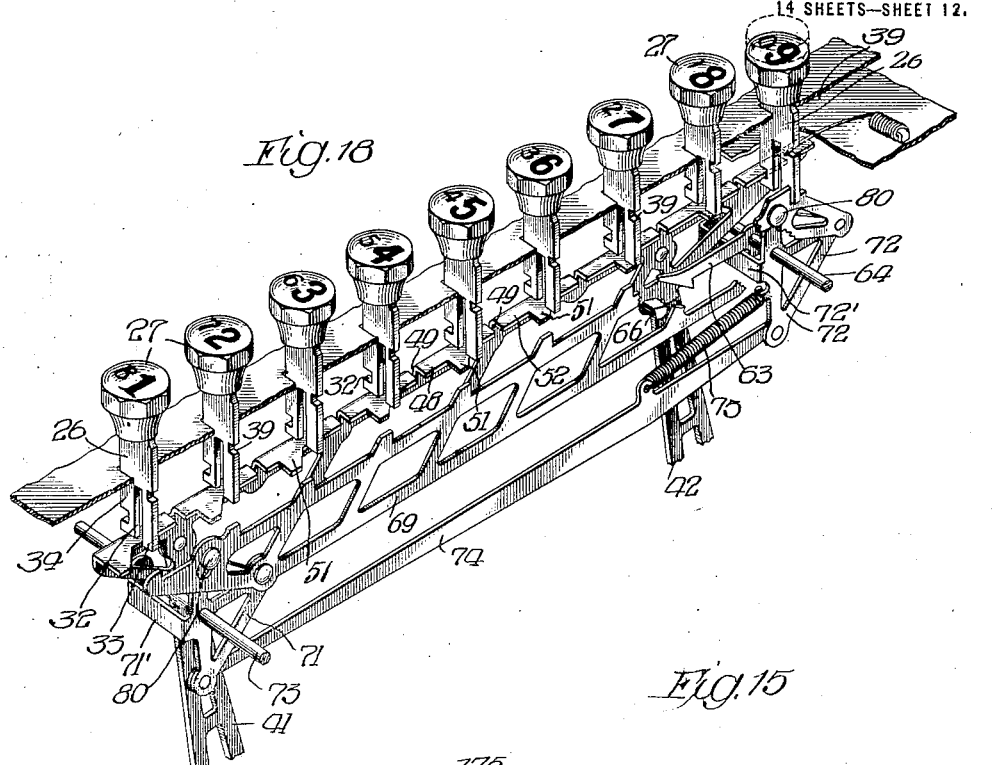
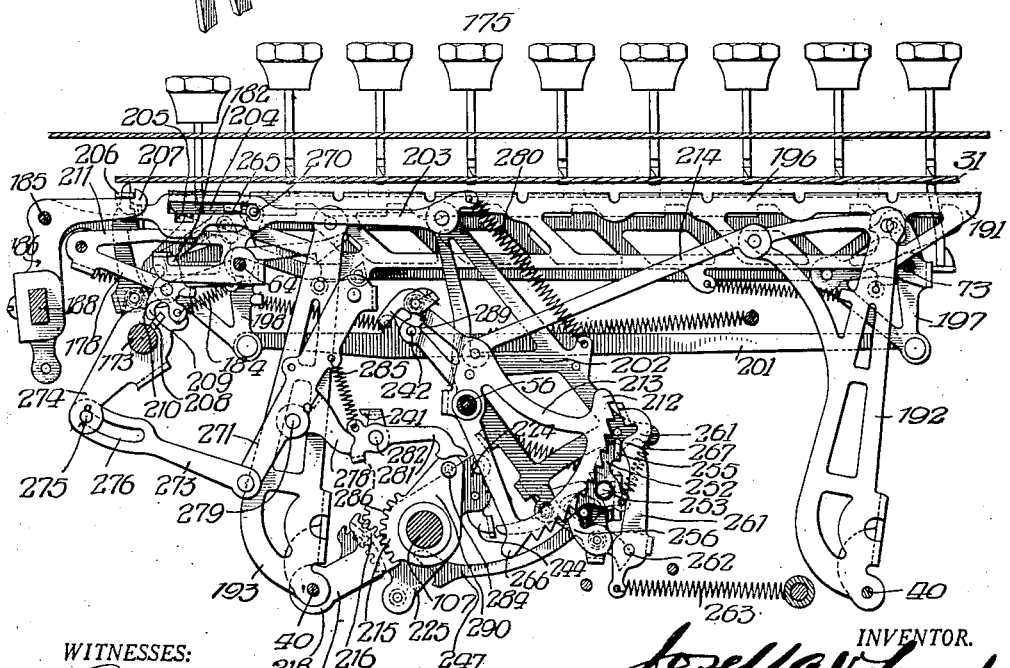
WITNESSES:
INVENTOR.

J. A. V. TURCK.
CALCULATING MACHINE.
APPLICATION FILED SEPT. 30, 1918.

1,371,954.

Patented Mar. 15, 1921.
14 SHEETS—SHEET 13.

J. A. V. TURCK.
CALCULATING MACHINE.
APPLICATION FILED SEPT. 30, 1918.

1,371,954.

Patented Mar. 15, 1921.
14 SHEETS—SHEET 14.

UNITED STATES PATENT OFFICE.

JOSEPH A. V. TURCK, OF WILMETTE, ILLINOIS, ASSIGNOR TO FELT & TARRANT MFG. CO., OF CHICAGO, ILLINOIS, A CORPORATION OF ILLINOIS.

CALCULATING-MACHINE.

1,371,954. Specification of Letters Patent. Patented Mar. 15, 1921.

Application filed September 30, 1918. Serial No. 256,174.

*To all whom it may concern:*

Be it known that I, JOSEPH A. V. TURCK, a citizen of the United States, residing in Wilmette, in the county of Cook and State of Illinois, have invented a new and useful Improvement in Calculating-Machines, of which the following is a specification.

This invention relates in general to calculating machines and has for its object broadly the provision of new and improved calculating mechanism for adding and subtracting, multiplying and dividing, which may be incorporated in a power-driven key-responsive calculating machine and which will be possessed of high efficiency and be of certain and rapid automatic action.

A principal object of the invention is the provision of a calculating machine, operable at high speed, for the adding and subtracting, multiplying and dividing, the parts of which will be so constructed and arranged that the machine may be arranged for addition and subtraction or multiplication and division by the mere setting of a multiplication or controlling lever and readily changed from arrangement for one operation to that of another by shifting of such lever.

During multiplying it is intended that the multiplicand may be set up upon the usual adding keys and the multiplication by the desired number be accomplished automatically and immediately upon the striking of proper keys of a series of multiplier keys, the setting of any one of which starts the operation of repeated addition, repetition continuing the number of times determined by the value of the key struck.

A further object of the invention is the provision of such a machine in which all of the calculating movements will be positively produced by or from a continuously moving power member.

A still further object of the invention is the provision of such a machine employing the segment levers and accumulating devices of the general character of those of the well-known comptometer and in which such devices will actuate in substantially their usual manner.

A further and highly important object of the invention is the provision of a calculating machine so constructed that mismanipulation of the keys, *i. e.* imperfect key strokes, and premature actuation of the keys will be prevented.

A still further and highly important object of the invention is the provision of a calculating machine having mechanisms which may be rendered key-responsive or key-set at the will of the operator.

Other objects and advantages of the invention will be apparent as it is better understood from the following description when considered in connection with the accompanying drawing illustrating a preferred embodiment thereof.

On the drawings,

Fig. 2 is a side elevation of the same;

Fig. 3 is a top plan view of the same with the casing and key carrying portions removed;

Fig. 4 is a front-to-back vertical section taken through the adding mechanism and looking to the right viewing Fig. 1;

Fig. 5 is a similar view taken at the side of an adding machine and looking toward the left.

Fig. 6 is a view similar to Fig. 4 and taken at the side of an adding mechanism;

Figs. 7 and 8 are transverse vertical sections across the machine and looking in opposite directions;

Figs. 9, 10 and 11 are partial details showing the action of certain parts in adding and subtracting;

Fig. 12 is a vertical section similar to Figs. 4 and 6 but taken at the extreme left of the calculating machine and showing the lever for arranging the calculating machine for adding and subtracting or for multiplying and dividing;

Fig. 13 is a similar view taken at the other side of the machine and inwardly of the series of multiplier keys;

Fig. 14 is a similar view taken through the multiplier devices;

Figs. 15, 16 and 17 are partial detail views showing the action of the parts in multiplying;

Fig. 18 is a perspective view of a series of adding keys and the parts immediately associated therewith; and Fig. 19 is a vertical section showing parts of a zeroizing mechanism.

Figure 1:
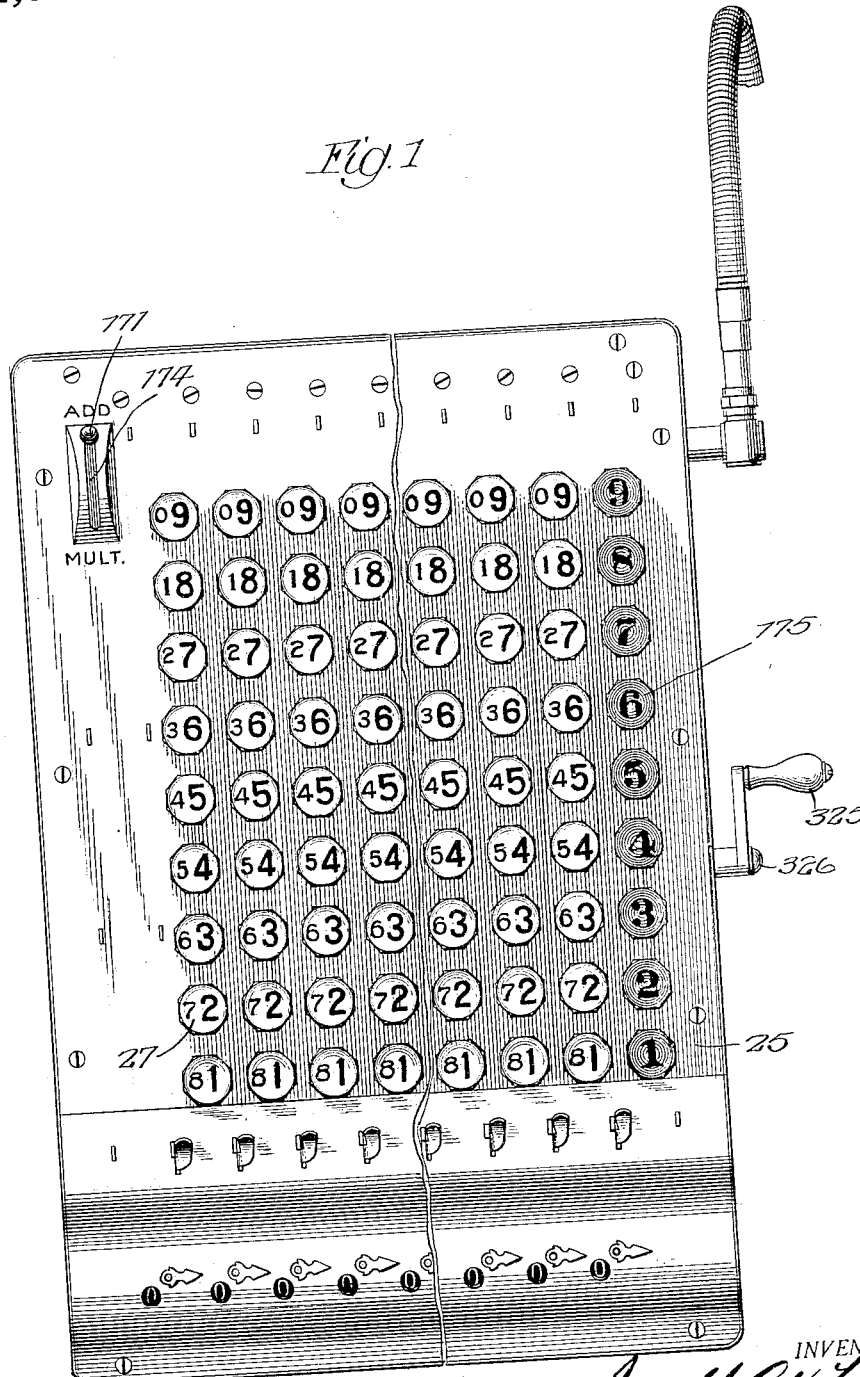
Figure 1 is a top plan view of an adding machine embodying my present invention.
Figure 16:
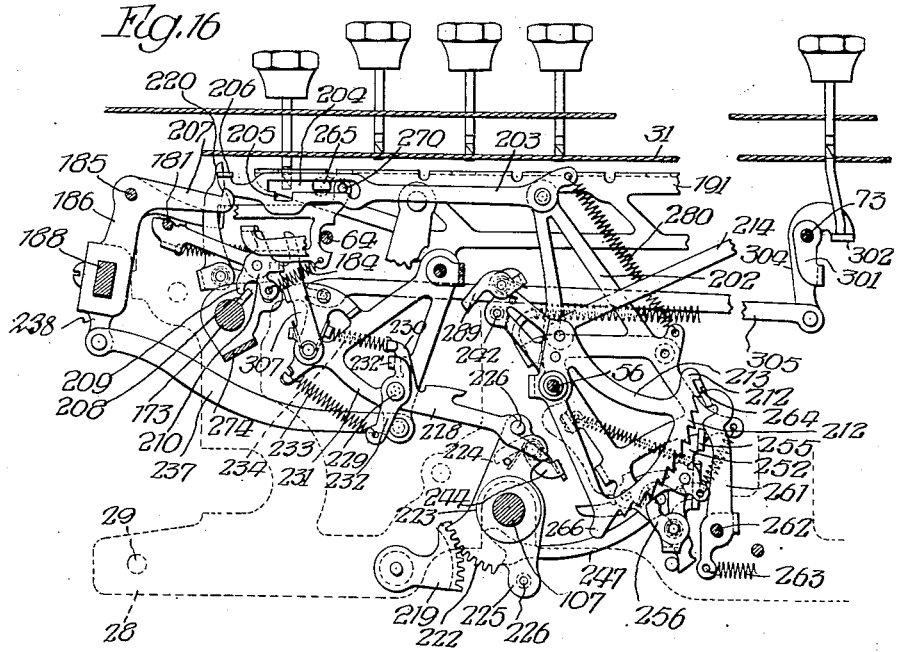
Figure 17:
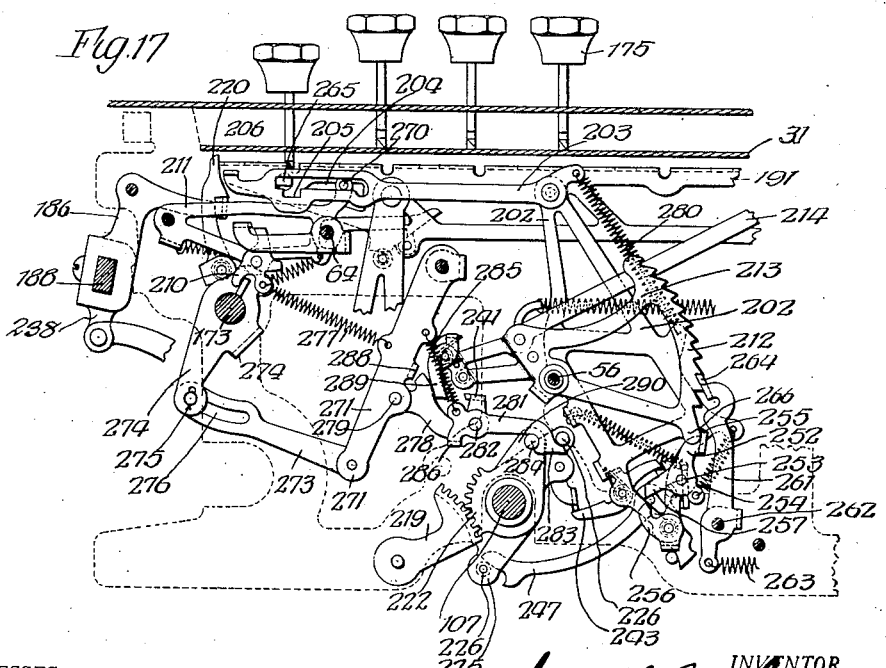

My present invention includes an adding mechanism, except in certain particulars like that in my co-pending application executed by me June 20, 1918, and in the embodiment of the present invention shown on the drawings this adding mechanism is incorporated. The machine in adding operates in substantially the same fashion of the machine of my co-pending application mentioned, the machine in this operation being key-responsive; that is to say, the prime actuators are immediately operated as the keys are individually depressed and, in the present instance, from a continuously moving power shaft. Key-responsive means that the calculating actions of the segment levers are individual and immediate and from a force other than the force supplied by the key stroke. In multiplying the action of the machine is key-set; that is to say, the segment levers of a complete number are set by the keys in position to actuate and the segment levers of the complete number are given their operative stroke simultaneously from some outside power and are therefore subject to a common control. When operating in the key-responsive manner no action other than the mere pressing of a key is necessary to produce calculation; whereas in operating as a key-set machine some other member must be manipulated.

In the machine of my co-pending application when a key is struck a segment lever is lowered and the key locked down until the several parts operate by actuation by the positive power device. Stop and lock mechanisms are provided which are connected by positive link action with the segment lever. In accordance with the present invention it is proposed to render this link action either positive or loose thus in multiplying allowing the segment lever to be returned to normal position as in the adding movement while leaving the stop and locking mechanism in set position so that after the adding movement the segment lever may return into position for reactuation, the key which has been set being held in downward or locked position. The segment lever is repeatedly actuated by the continuous power mechanism a number of times in accordance with the depression of the particular multiplier key. When the actuations have reached the proper number the link connection is rendered automatically positive and the parts are returned to their normal or inoperative positions.

While from certain aspects the invention concerns itself with the multiplying, it is also true that it relates to the combination of the multiplying mechanism and the adding mechanisms and for the purposes of clearness therefore the adding mechanism will be described in detail, the accumulators and the portions actuated by the segment levers being substantially those of the comptometer machines and are described in Letters Patent of the United States No. 1,072,933 to Dorr E. Felt issued September 9, 1913, Patent No. 1,088,219 to Dorr E. Felt issued February 24, 1914 and other patents to Dorr E. Felt and also Patent No. 1,110,734.

For the purpose of illustrating the invention, I have shown on the drawings a machine in which it is embodied. The working parts are mounted within a casing 25 of any usual or preferred construction, through the top of which extend the key stems 26, each carrying a finger button 27, said button and stem constituting a digital key, upon which suitable indications, as numerals ranging from 1 to 9 with their complements, are provided. The operative parts are carried in a frame located within this casing, which consist of skeleton plates 28 disposed between the denominational or ordinal sets of mechanism and at each side of the machine within the casing walls, and tie rods or bars 29 are suitably arranged to connect said plates rigidly together and in certain instances to afford bearing pins or shafts for the moving parts.

A sub-top plate 31 is secured to the casing just beneath the top plate so that when the casing is taken off the keys will come with it and expose the internal mechanism. The keys are arranged in orders and denominations, each order or denomination extending from the front to the rear, and as stated, the key stems extend through the top of the casing. Each key stem 26 is rectangular in cross section and is of relatively short length. A vertical slot 32 (Figs. 7, 8 and 18) extends from its lower end upwardly, providing two legs 33 and 34, one of which, 34 (the one at the left viewing the front of the machine) is somewhat wider than the other, 33. The lower ends of each of these legs respectively extend through openings or slots in the sub-top plate 31, so that each key stem is guided in its movement by the top of the casing and the sub-top plate 31. Springs 37 are provided to hold the keys in elevated position, one end of each spring taking into a slot or recess 39 in the narrower leg. When a key is depressed the two legs 33 and 34 of its stem are moved downward together through the casing top plates and arrange the mechanism for adding actuation, which occurs almost instantly, if the machine be arranged for adding.

The parts and devices of the several denominations or orders of the machine are exact duplicates of each other in the present instance and a description of one of them will suffice for the others. Viewing Fig. 5, it will be noted that two relatively long arms 41 and 42 extend up from adjacent the bottom of the frame to just beneath the plate 31. These arms are pivoted upon cross rods 40 and are connected at their tops at 43 with a differential bar 44, said arms being parallel and movable about their pivotal axes to permit the bar 44 to have a longitudinal reciprocating movement. A spring 45 fixed at one end to a lug 46 on the forward arm 41, and at the other to a lug 47 on the under side of the bar 44, tends to move the arms 41 and 42 forwardly in the machine about their pivotal axes and to impart forward longitudinal motion to the bar 44. The top of the bar 44 is provided with a horizontally extending flange indicated at 48 in Fig. 3, which flange is cut away at intervals at 49 to provide spaced openings adapted to be disposed beneath the key stem when the bar is in retracted position, and a plurality of stops or lugs 51 extend out beyond the flange 48. When a key is depressed its leg 34 moves down through the appropriate opening 49, whereupon the bar 44 is permitted to move forwardly under the action of its spring 45, the portion of the flange 48 rearward of the opening 49, through which the leg of the key extends, passing through a slot 52 provided for the purpose. The bar 44 moves forward until a lug 51 engages the stem. The several lugs 51 are arranged rearwardly of the recesses at different distances, to provide a differential motion for the bar 44 in amount determined by the particular key of its order manipulated. It will be noted that the lug 51 back of the recess 49 at the left is nearer the recess than the similar lug back of the recess 49 at the right. In the first instance the companion key is the "1" key and in the latter instance the "9" key.

It will be noted that the bar 44 is connected by a link 53 with one end or arm 54 of a skeleton lever 55 pivoted upon a cross rod or shaft 56. This lever is a segment lever that actuates the accumulator and has an arm 57 extending forwardly, which carries a toothed rack or segment 58, which actuates the accumulator. As the bar 44 moves forward, which occurs upon manipulation of a key of its order, the link 53 moves forward also and the rack 58 swings downwardly in an idle stroke, the amount of this movement being determined by a particular key depressed. That is to say, the movement is terminated when the appropriate lug 51 engages a key stem. A spring 59 fastened at one end to a lip 61 on the lever 55 and at the other end to a rod 62 extending across the machine produces this forward movement. The bar 44 is normally retained in position to hold the rack and arm or segment lever 55 elevated by a latch 63 pivoted upon a fixed rod 64 in the frame of the machine and engaging over a stud 66 carried by the arm 54. A spring 67 secured to a tail 65 of the hook or latch 63 and to a part of the mechanism, which will be later described, normally pulls the latch downwardly in clockwise direction (viewing Fig. 4) and into engagement with the lug 66. This latch is adapted to be released at each depression of a key by a mechanism to be now described.

A release bar 69 is provided beneath the legs 33 of the keys of each order and pivotally connected to yokes 71 and 72 pivotally mounted respectively upon cross rods 73 and 64 at the front and rear ends, each yoke having a perforation in its main part through which the rod passes and having wings 71' and 72' extending out at the side and returning upon themselves, the return portion being perforated also for reception of the rod. A lower bar 74 also connects the yokes and this bar is connected by a spring 75 with the rear yoke 72, said spring and the bars and yokes being so arranged that the spring tends to swing the bar 69 upwardly. The release bar 69, yokes 71 and 72, and the lower bar 74 are thus so arranged that the bar 69 may be lowered and retained in parallelism with its normal position and the yokes have a pin and slot connection 80 with the release bar for limiting the movement under key pressure. The wing 72' of the yoke 72 is disposed immediately beneath and in contact with the latch or hook 63. The pivotal connections between the bar 69 and the yokes 71 and 72 are rearwardly of the axes of pivotal movement of the yokes and in almost horizontal alinement with them, so that when a key is depressed the bar 69 has nearly a true downward movement. This swings the yoke 72 forwardly and lifts the wing 72' to release the latch. During this time the key is moving on down and when the latch is released the slot 52 in the leg 34 of the key is in registration with the flange 48 on the bar 44, which flange now moves into the slot of the key, holding it down until the bar 44 is returned to normal position at the end of the calculating movement, as will be presently described. The differential bar 44 continues to move forward until the appropriate lug 51 engages the side of the key stem and the machine is then set to have the number added into the accumulators by the action of the continuously moving power members now about to be described, it being understood that the segment lever has moved down an amount determined by the particular key of the order manipulated and the adding operative movement is the return or upward movement of the segment lever. A like action occurs in multiplying as will be later described.

A continuously rotating power shaft 91 extends transversely of the machine at the rear and has bearings at 92 in the frame of the machine.

The shaft 91 is provided at its left-hand end with a crank 104 connected to a link 105, which in turn is connected to a crank 106 upon a shaft 107. By reason of this crank connection reciprocating or oscillating movement is continuously imparted to the shaft 107 and it is from this shaft that direct production of the adding movement is accomplished. The shaft 107 passes clear across the machine and is provided adjacent each segment lever or arm 55 with oppositely extending arms 108 and 109 adapted to oscillate with the shaft. One of these arms extends upwardly and in the oscillating movement of the shaft is thrown forward and downwardly. This arm carries a dog 111 pivoted at 112 on the arm and having a tail 113 above a stop pin 114 against which it is normally held by a spring 115. Under certain conditions when the arm 108 is moved in a clockwise direction it engages a tail 116 of a pawl 117 pivotally connected at 118 on the segment lever or arm 55 and spring-pressed in a clockwise direction by a spring 119. The dog 117 engages in one of two teeth 121 and 122 in the upper end of a swinging bracket arm 123, as best shown in Figs. 9 and 11, which arm is pivoted at 124 on the segment lever. A driving arm 125 is pivoted on the bracket arm 123, which, as will be later described, is positively and directly engaged to actuate the segment lever when the segment lever has been lowered for an operative return stroke. The tail of the bracket arm is connected by a spring 126 (Fig. 4) with the segment lever, such spring tending to move the arm in a counter-clockwise direction. A spring 120 is provided to pull the bracket arm about the pivotal connection of the driving and bracket arms and engages suitable lugs on the two arms to press the driving arm in a counter-clockwise direction (Fig. 9), movement in this direction being limited by the pivot pin 124 on the bracket arm which engages the right-hand end of the driving arm. The dog normally engages the forward tooth 121, as shown in Fig. 9, holding the arm elevated.

Viewing Fig. 9, it will be noted that the projection or arm 109 on the shaft 107 is provided with a driving pin 127 and in the oscillation of the shaft 107 this pin is swung in a counter-clockwise direction in its operative stroke. The arm 125 normally rests above the arc of travel of the pin 127 and is adapted to be operatively arranged for engagement therewith by the shifting of the pawl 117 from the lower notch 121 to the upper notch 122 under the action of the stop 111. This action will be seen by comparing Figs. 9 and 10. The segment lever 55 when in upper raised position holds the pawl 117 out of the path of travel of the stop 111, so that in the mechanisms associated with the rows of keys which have not been manipulated to lower the segment levers to operative position no action of the pawls 117 is produced by oscillation of the shaft 107. When, however, a key has been depressed and the segment lever swung downwardly a corresponding or desired amount, the tail 116 of the pawl is moved into position to be engaged by the dog 111 to move the pawl out of engagement with the tooth 121 and into engagement with the notch 122. Of course the pawl will assume different positions with respect to the path of movement of the dog, depending upon the amount of movement of the segment lever, and in order that in its various positions the pawl may be properly engaged, it is somewhat elongated. In order that the driving arm may be accurately engaged when the segment lever has been lowered in response to the lower numeral keys, the arm 125 is provided with a tail 131 adapted to move down upon the pin 127, and under certain circumstances acts as a guide to insure engagement of the jaw 130 of the pawl with the pin 127. After oscillation of the arm 108 on the shaft to set the pawl 122 the shaft starts a movement in the reverse direction, swinging the arm 109 and its pin 127 in a counterclockwise direction, viewing Figs. 9, 10 and 11, engaging the jaw of arm 125 and moving the segment lever up to its normal position, which movement of the segment lever accomplishes the adding movement in the accumulator, as will be presently described.

The segment 58 of the segment lever is in continual mesh with the pinion 141 upon a pinion shaft 142 extending across the machine and this pinion is connected by a ratchet 144 with a lantern wheel 143. The accumulator mechanism, which includes these last mentioned parts and the numeral wheels 139 and connecting parts, is in the present instance substantially that of the well-known comptometer, fully described in Letters Patent of the United States No. 1072933 to Dorr E. Felt, issued September 9, 1913 and other patents to said Dorr E. Felt, and also in United States Letters Patent No. 1,110,734, and also mentioned in my co-pending application Serial No. 231,814, filed May 1, 1918, for zeroizing mechanisms, and need not therefore be described in detail. It should be mentioned, however, that the lantern wheel 143 has fixed to it a pinion 140, which is the first of a chain of gears 145, 146 and 147 mounted respectively on shafts 148, 149 and 151, which connect the lantern wheel with the numeral wheel, the last mentioned gear, 147, being fixed to such numeral wheel. Suitable safety devices against overthrow and back-latch and mechanism for carrying are provided, which need not be described here, except to state that the stops and safety devices engage the lantern wheel and that the carrying is actively done in the first instance from one order to the next higher by a spring 152 attached to the gear 145 and to an escapement driving mechanism indicated generally at 153 in Fig. 5. As the numeral wheels are advanced power is stored up on these springs, which, after a numeral wheel has completed a summation of advances of ten steps, is released to impart a single step advance to the next higher wheel.

The numeral wheels, through the mechanisms described, receive action or calculating movement by the upward travel of the segments under positive actuation of the arms 125, in turn positively actuated from shaft 107. When the machine is arranged for adding one such actuation results from the depression of each key in any of the orders of the machine and when the machine is thus arranged actuation of a segment, and through the segment the accumulator, results in an immediate rearrangement of all of the parts back to normal position. In multiplying, however, this complete rearrangement is not perfected until after the segment lever has been operated in this fashion the desired number of times to effect the multiplication. In multiplication it is necessary therefore that the segment lever of each of the orders being multiplied may be merely controlled as to extent of movement by the differential control bar 44 and that it be otherwise controlled by the multiplying mechanism proper. In other words, in adding the control of each segment lever is by mechanism wholly individualized to said segment lever, and in multiplying by mechanism at least in part disassociated from the particular mechanism of the particular segment lever and preferably exerting a common control of all the segment levers.

It has been mentioned that each segment lever is connected by a link 53 with the differential bar 44 particularly associated with the particular segment lever. This link, best shown in Fig. 6, is provided with a slot 161 at its free end, the forward end 162 of the slot being extended down, and a recess 163 of rectangular shape being provided to communicate with the rear end of the slot. A lug 164 is provided upon the link and connected by a spring 165 with the segment lever so that the link is pulled up in a clockwise direction (viewing Fig. 6), a rectangular lug or stop 166 extends out from the side of the differential bar 44 and into the slot and this stop rests in the recess 163 under normal conditions, the spring 165 holding the link in proper position. When the machine is arranged for adding, the stop 166 rests continually in the recess 163 so that the connection between the link and differential bar 44 is substantially fixed. Upon a key being struck the latch 63 is lifted, the differential bar moves forward an amount determined by the particular key, the segment lever drops correspondingly, the pawl or dog 111 shifts the latch 117 from engagement with the notch 121 in engagement with the notch 122 dropping the arm 125 into the path of the reciprocating pin 127; return movement of this pin lifting the segment lever actuates the accumulator to perform the adding. At the end of this lifting movement a stop 167 on the segment lever engages a cross shaft 168 and a slight further movement of the pin 127 pushes the bracket 123 about its pivotal axis to permit the latch 117 to reëngage in notch 121 and at the same time the latch 63 drops back into locked position.

During a multiplying movement the lug 162 is maintained out of engagement with the recess 163 of the link 53 until a desired number of actuations of the segment lever have taken place.

To arrange the mechanism for multiplying, a finger piece 171 formed upon the end of a swinging arm 172 mounted upon a shaft 173 within the frame, extends through a slot 174 in the top wall of the casing, as may be seen upon viewing Figs. 1 and 12. At the right-hand side of the machine is arranged a column of keys 175 numbered 1 to 9. Before multiplying, the finger piece 171 is moved to the position indicated for multiplying, the multiplicand set up upon the denominational keys 27, and the successive digits in multiplier upon the keys 175, the operation being repeated in accordance with the numbers of figures in the multiplier.

The shifting of the finger piece 171 brings into action a control mechanism which will be now described. The arm 172 is clutch connected upon the shaft 173 which rocks when the finger piece is moved. This shaft carries a number of fingers 176, one located at each denominational set of mechanisms. This finger moves beneath a tail 177 of a dog 178 pivoted upon a swinging lever or arm 179, which in turn is pivoted upon a cross shaft 181 and the spring 67 already mentioned engaging a latch 63 at one end engages the arm 179 at the other. This arm or lever 179 carries at its forward end a pin 189 disposed normally in the forward end of the slot 161. The dog 178 has an operating part 182 adapted to be disposed beneath a shoulder 183 upon the end of an arm extending back from the wing 72' of yoke 72. When the finger piece 171 is in the adding position the fingers 176 bear against the tails of the dogs and hold them out from beneath the shoulders 183. When, however, the finger piece is in the multiplying position springs 184 secured to the dogs and to the levers 179 pull these dogs over into position to coöperate with the shoulders 183. In this position downward pressure upon the lock bar results in the depressing of the rear end of a link until the stop 166 is free of the recess and the link and differential bar of the mechanism of the particular denomination are thus free for independent movement. Upon a cross shaft 185 is mounted a plurality of bell cranks 186, each having one arm provided with a hook or latch 187 and the other secured to a common control bar 188. The latches 187 are normally beneath and in advance of overturned lugs 190 upon the rear of the links so that when these links are pulled down by the action of the arms 166 they immediately hook up and are held by the latches 187. The actual downward movement of the rear end of the links is accomplished by pins 189 carried on the forward ends of the arms 179 and normally resting in the forward downturned ends of the slots. The setting up of the multiplicand therefore is attended only by the releasing of appropriate latches 63 and movements of the appropriate or selected denominational bars 44, the segment levers remaining in elevated position and the parts remain so until multiplication begins.

I will now describe the multiplier control mechanism and the action which accompanies the depressing of the keys of the multiplier column. Referring now to Figs. 13 to 17 inclusive, it will be noted that a differential bar 191, similar in every respect to the differential bar 44, is provided upon the upper ends of upstanding arms 192 and 193 upon the cross shafts 40 like the upstanding arms 41 and 42 of the denominational series of mechanisms. A locking release bar 196, yokes 197 and 198, and lower bar 201 are provided and closely resemble locking bar 69, yokes 71 and 72 and lower bar 74 of the denominational series of mechanisms.

Upon the shaft 56 is mounted a skeleton frame or lever 202 which is connected at its upper end with a link 203 like the links 53 except that its slot 204 extends rearwardly of its recess 205 a slight distance for a purpose to be later explained. Like the link 53 it carries a shouldered tail 206 adapted for engagement with a latch 207 upon the bar 188. When any multiplier key is depressed, the parts being arranged for multiplication, the differential bar 196 moves forward an amount determined by the particular key, the shaft 173 being provided with a finger 208 engages under a tail 209 of a dog 210 upon a lever 211 pressing down the link 203 in the manner already described in connection with the action of the links 53. Forward movement of the differential bar is accompanied first by the setting of a multiplier determinator consisting of a toothed rack 212 upon one end of a lever 213 pivoted upon the shaft 56 and connected by a link 214 with the forward arm 192 attached to the differential bar, this toothed lever being swung downwardly in amount corresponding to the particular key depressed. Immediately thereafter the links of the several orders of keys are released and the segment levers of the orders of keys set up in the multiplicand permitted to drop to begin the multiplying operation. This is accomplished in the following manner: Upon the shaft 107, which it will be remembered is the continuously oscillating shaft extending across the machine, is fixedly mounted a mutilated pinion 215 which is in continuous mesh with a similar pinion 216 upon one arm 217 of an oscillating member 218 upon shaft 40. The other arm 219 of this member carries a pinion 221 meshing with a pinion 222 (both mutilated) upon a member 223 loose on the shaft 107 and having arms 224 and 225 much like arms 108 and 109 of the mechanism of the denominational orders. The length of the arm 217, however, is greater than the length of the arm 219 so that these several gears and arms form a reducing mechanism for the throw of the arms 224 and 225.

Upon the arm 224 is provided a pin or stud 226 which is adapted to engage in a jaw 227 upon the end of an arm 228 pivoted at 229 on a lever 231. This arm has an upwardly extending lug 230 pulled by a spring 234 in an upward direction. A pressure stop member 232 is provided upon the pivot 229 and is normally pressed in the opposite direction by a spring 233 more powerful than the spring 234. This pressure stop member has a bent lug 232′ extending past the lug 230 and normally beyond it a slight distance the stop member being limited in its clockwise movement by engagement with the lever arm 231 as indicated in dotted lines in Fig. 14.

The lever 231 is connected by a link 237 with a lug 238 extending down from the bar 188 so that movement of the lever in a clockwise direction (viewing Fig. 14) will result in a clockwise movement of the bar 188 about its pivot axis and releasing the links of the denominational orders. As a result the segment levers of the several denominations which have been set up in the multiplicand are immediately dropped into position for actuation.

This action prior to this time has been prevented by a pin 242 upon the end or arm (see Figs. 14 and 16) of the rack carrying lever 213 which presses down upon the arm 228 so long as the lever 213 is in normal position. When the multiplier determinating rack is lowered the pin 242 is raised and the spring 234 pulls the arm 228 up in position to engage the stud 226 already mentioned upon the first following counter-clockwise reciprocation of the arm 224, the pressure stop permitting yielding should the first subsequent reciprocation be a clockwise one. The links after release continually reciprocate back and forth during the multiplying operation as will be later described, the segment levers dropping each time an amount determined by the positions of the control bars 44, and in order that they may not be latched up again by the latches 187 a hook or detent 220 is provided to engage over an arm 207 swinging with the bar 188 as this bar is moved from one position to the other. The latch or detent 220 is normally spring-pressed toward the front of the machine and is held back out of operative position by the multiplier differential bar so that upon the swinging of the bar 188 to release position, which occurs after the multiplier differential bar has moved forward, the latch 220 hooks up upon the arm 200 and stays hooked up until the differential bar is returned to normal position after the multiplying operation is completed. The lever 202 is released and permitted also to move forward simultaneously with the first movement of the segment levers and the movement of this lever permits the stroke determining action of the multiplier determinator to start. The lever 202 has only a slight motion upon release. The motion is, however, sufficient to carry a latch 243 like pawl 116 and similarly mounted into the path of a dog 244 on the arm 224. The latch 243 engages one or another of two notches 245 and 246 in an arm 247 carried in a swinging bracket 248 pivoted in the frame or lever 202 at 249. The latch 243 normally engages the lower notch 245 and holds the arm 247 elevated and out of the path of a pin or stud 251 upon the downwardly extending arm 225, already mentioned. The dog 244 upon engaging the latch 243 moves it out of engagement with notch 245 and into engagement with notch 246.

The lever 202 carries an actuating pawl 252 pivoted at 253 and pulled by a spring 254 in a counter-clockwise direction (viewing Fig. 17) toward the rack teeth. The pawl 252 has an operating tooth 255 which is normally held out of engagement with the rack tooth by a latch 256 disposed beneath its tail 257, this latch being mounted on the frame or lever 202 and releasable only when the latch 243 is shifted from the lower to the upper notch of the arm 247.

The latch 256 is mounted upon the pivotal axis of the bracket 248 and has a tail 258 engaging the bracket and held thereagainst by a spring 259. When the arm 247 is moved down into position for engagement with the stud 251 the pawl is released and is ready to return the rack to normal position under the action of the arm 247. This pawl imparts a step by step return movement to the rack advancing it one notch at each double reciprocation of the shaft 107, a back stop 261 being pivoted at 262 and pulled by a spring 263 toward the rack. This back stop carries an operative tooth 264 adapted to engage in the teeth of the rack to hold it in the successive positions given it by the pawl 252. At each reciprocation of the shaft 107 by reason of reducing motion the arm 202 gives to the pawl 252 an arcuate movement equal to the length of one tooth and it will of course be understood that at each reciprocation of the shaft 107 an adding movement is imparted to the set column actuators or segment levers so that these reciprocations continue with corresponding adding accumulators until the pawl 252 has imparted to the rack a number of successive steps of movement determined by the particular multiplier key depressed. Upon the completion of these successive accumulations and successive step advance of the multiplier control member, the parts automatically free themselves of the previous multiplication setting.

Considering first the action of the multiplying device at the completion of the steps, it will be noted that when the differential bar 196 is moved forward its stop 265 is carried ahead of its recess 205 an amount determined by the particular key depressed and the consequent arcuate movement of the forward arm 192, its position in the slot (in Fig. 15) being that provided by the depression of the 9 key. The link 203 is continuously held down by the mechanism described for the purpose and return movement of the rack 212 results in a like return movement, i. e. movement to the left in Fig. 15 of the differential bar 191. It is intended that the last advance of the multiplier mechanism, i. e. the advance accompanying the last adding movement of each denominational mechanism, will be accompanied by a complete resetting of the parts into normal position. It will be understood that the link 203 reciprocates with each actuation of the driving arm 247 and has a constant reciprocation therefore during multiplying while the stop 265 is progressively retreating to normal position, being held from engagement with the stop by the pin 270 like the pins 189, already described, and mounted on the lever 179. The last progressive movement in multiplying is accomplished with the stop 265 engaged in its recess 205, as will be later described more in detail.

When the multiplier determinator rack has been actuated a proper number of times to return the differential bar 191 to a position one step in advance of its normal position, a projection 266 at its lower end engages the pawl tooth 255 moving it outwardly so that the tail of the pawl is in position to engage upon the top of the dog or stop 256 and is held in this position throughout the last actuation. During this next to the last multiplying operation, a dog 241 mounted upon the tail of the multiplier determinator moves down upon a shoulder 289 of a two-part arm consisting of one part 278 pivoted at 279 on the lever 271 and a second part 281 pivoted at 282 on the part 278. The part 281 has a hooked end 283 adapted to engage a pin 284 upon the arm 290 formed with the pinion 215, which pinion, as has been stated, is fast on the shaft 207. A spring 285 is attached to the rear end of the part 281 and to the lever 271. A lug 286 on the part 281 is disposed beneath the part 278 so that the pull of the spring is felt by both parts and the part 278 is normally pulled up by the spring 288 on the lever 271 into position shown in Fig. 15.

The two-part arm is normally elevated above the pin 284 and downward pressure of the dog 241 upon it presses it down into position for engagement by the pin. Viewing Fig. 13 it will be noted that the shape of the end of the arm is such that engagement by the pin is assured, the arm yielding at the connection between the two parts if the pin is beneath the hook.

Upon the clockwise movement of the pin preceding the last actuation of the accumulators, the pin is engaged by the hook of the two-part arm and exerts a forward pull upon the lever 271 which through the shaft and through the link 273 rocks an arm 274 and shaft 173 moving the dogs 178 and 210 out from beneath the rear yoke shoulders to release the links.

The links of the denominational orders, when the segment levers reach their position after the ninth actuation, are pulled up by the springs and engage the stops forming again the positive connections between the differential bars and the links ordinarily present in the adding actuations. The link of the multiplying mechanism moves forward as in the earlier steps of the multiplying operation and upon the forward thrust of the pins 127 and 251 the adding mechanisms make a last addition, i. e. last step of the multiplication and the multiplier mechanism completely resets itself to normal conditions as do also the adding mechanism, which resetting of the adding mechanism has already been described in connection with the adding operation.

The resetting of the multiplier mechanism is accomplished as follows: The arm 247 moves forward as before and imparts the usual return reciprocation to the link 203 and as this link nears the end of its movement it comes into registration with the stop 204 which enters the recess 205, the further movement of the link and the differential bar and the swinging up of the multiplier determinator occurring together. The pawl 255 being still held out is swung up also and engages a projection 267 on the detent or stop 261 and holds this out of position. These movements all occur just before the end of the throw of the pin 251 and completion of its stroke swings the bracket 248 about its pivot, disengaging the pawl 243 from notch 246 and permitting it to drop in notch 245. This movement of the bracket permits the dog 256 to rock under action of its spring into position beneath the tail of the pawl 252 so that this pawl is locked out of action in the next multiplier setting operation.

The dog 289 has been moved down behind the stop 241 so that there is no reëngagement at this time between this dog and stop. The connection between the shaft 173 and the multiplier finger piece is a clutch connection which, in adding position, holds the shaft 173 over so that the fingers press the dogs 210 out of operation; and in multiplying position permits this shaft to be moved by the spring 277 so that after the hook is released the parts resume the position shown in Fig. 17 with the shoulder 241 above the end of the dog 289.

In order that the movement resulting from pressing the one key when the machine is arranged for multiplication may be instantaneous and the unlocking and locking of numerous of the parts avoided, I provide separate mechanism for instantly permitting connection between the links and differential bars and the orders of keys set up as a multiplicand.

Upon the shaft 73 is mounted a lever 301 having a stop 302 engageable by the stem of the one key. This lever also has a downwardly extending arm 304 pivoted to a cross bar 305 which extends rearwardly in the machine and has a slotted rear end engaging over the pin 306 upon arm 235. Arm 235 carries a stop 307 against which is pressed a finger 308 having a jaw 309 adapted for engagement with a pin 311 provided in a part of the arm 274. When the one multiplier key is depressed the bar 305 is thrust rearwardly moving the part 235 rearwardly bringing the jaw 309 into position to engage beneath the pin 311. The actuation of the arm or dog 228 moves the lever 231 rearwardly thus carrying the arm 309 upwardly into latched engagement with the pin 311 and further movement rocks the shaft 173 to release the dogs and permit instant latching up of the stops of the differential bars and the links connected with the several segment levers and with the multiplier determinator. Movement of the shaft 107 then produces a single adding movement and leaves all of the parts of the machine in their normal operative positions as just described.

The latch bar 188 is pulled up to latching position by a spring 312 secured to the bar 188 Fig. 19 and to the frame of the machine at 313. This bar remains stationary during adding with the ends of the links disposed well above it and in multiplying it is held down against the force of the spring 212 by the latch 220.

A zeroizing mechanism is provided to clear the machine and this zeroizing mechanism is substantially like that described in my co-pending application mentioned. The zeroizing lever 325 fast on the end of a shaft 326 is provided to be grasped by the operator when it is desired to clear or zeroize. Upon the shaft 326 is mounted a lever 327 pulled by a spring 328 toward the rear of the machine. This lever carries in its forward end a cam roller 329 engaging the cam face 331 of a lever 332 pivoted at 333 on the adjacent side plate. This lever is connected by a link 334 with an arm 335 loose upon a shaft 336. This lever has a lug 337 inter-engaging with a lug 338 upon a second arm 339 fast on the shaft 336. A series of levers 341, having a sliding fulcrum at 342, are pivotally connected at 343 to arms 344 fast on the shaft 336. In zeroizing it is intended to permit the carrying springs 152 to return the numeral wheels to zero and to this end the gear mechanism, already described, connecting the lantern wheels with the numeral wheels, is interrupted, it being remembered that the various latches and back stops, etc., operate upon the lantern wheel or the ratchet connected to it. This connection of this gear mechanism is a detraining connection and is accomplished by swinging a frame composed of plates 345 connected by cross rods 346 about the shaft 151 of the numeral wheels. The movement is controlled by a series of toggles composed of links 347 being pivoted to the main frame of the machine and to the levers 348, and the levers 348 have a pivotal connection at 349 with the swinging frame. The levers 341 each carry a pin 351 engaging within jaws 352 of a lever 348, springs 353 serving to maintain the toggle in either of the toggle arranged positions. When the lever is operated the arm 327 moves to the left, viewing Fig. 19, (Fig. 19 is a vertical section taken just inside the righthand casing wall) swinging the lever 332 in a clockwise direction and rotating the shaft 336 in opposite direction. This slides the levers 341 forwardly and downwardly and the pin 351 breaks the toggle connections which, as shown in this figure, are arranged to maintain the gears entrained swinging the toggles upwardly and permitting the springs 353 to complete the movement of detraining the gears. Immediately upon the detraining of the gears, which occurs between the pinion 140 on the the lantern wheel and gear 145, the numeral wheels rotate the parts to zero positions at which time stop devices, as described in my earlier mentioned application, arrest the movement. As soon as the hand lever is released a relatively powerful spring 354, engaging an arm 355 on the shaft 336 and secured to the frame at 356, rotates the shaft 336 in the opposite direction moving the levers 341 upwardly and to the rear and breaking the toggle connections, the springs 353 reëstablishing the gear train and arranging the machine for subsequent calculations.

It will be understood that subtraction and division may be performed on this machine by proper manipulation and proper use of complements of the numbers involved in the calculation.

It will be manifest that in adding the action of the machine is key-responsive; that is to say, the calculating actions occur immediately upon the pressing of the individual keys so that the action may be said to be power induced and individualized to the particular order in which the key has been pressed and that in multiplying the action of the machine is key-set; that is to say, the number to be added in one or more times as in multiplying is set up on the machine without resulting calculation, such calculation occurring immediately upon the pressing of a suitable key in the present embodiment of the machine, this key being any one of the multiplier keys. I contemplate, however, all of the advantages which may accrue by reason of the presence in the same machine of mechanisms both key-responsive and key-set. It will also be manifest that the shifting from the key-responsive arrangement to the key-set arrangement is accomplished by a very simple operation of the operator, namely, the mere moving of the lever carrying the finger piece.

It will be manifest also that the machine embodying my invention and described in this specification is of extremely fast action and capable of being manipulated very rapidly. With the key-responsive adding action the strokes may overlap without interference and in the key-set the multiplicand may be set up by simultaneous manipulation of desired ordinal keys or individual manipulation thereof or with overlapping key strokes. Multiplying is preferably accomplished, although there are other ways, by setting up the multiplicand so that the units column is in the order of keys removed from the right hand side a number of orders one less than the number of digits in the multiplier; a multiplier key corresponding to the number of the highest order of digits in the multiplier may then be struck and the operation repeated setting up the multiplicand one column nearer the right and pressing the multiplier key of the next higher digital order in the multiplier. In other words if 127 is to be multiplied by 46, 127 is set up in the denominational order with the 7 located in the 10s column, and the 4 key of the multiplier is pressed. Number 127 is again set up with the 7 in the units column and the number 6 key of the multiplier is pressed completing the operation. Each multiplication operation occurs rapidly after the multiplier key has been pressed and requires only the time for the continuously rotating shaft to give the desired number of revolutions and this shaft may rotate at considerable speed.

While the key-set and key-responsive mechanisms are in this machine for the purposes of facilitating the adding and the multiplying operations, it will be understood that I desire to protect such combinations of key actuations and mechanisms in other uses and for other purposes.

It is thought that the invention and many of its attendant advantages will be understood from the foregoing description, and it will be apparent that various changes may be made in the form, construction and arrangements of the parts without departing from the spirit and scope of the invention or sacrificing all of its material advantages, the form hereinbefore described being merely a preferred embodiment thereof.

I claim:

1. In a power-driven calculating machine, in combination; a plurality of ordinal keys; calculating mechanism for performing both addition and multiplication; a multiplying control; and means for optionally rendering said calculating mechanism directly responsive to ordinal key-actuation to perform addition, or responsive to said multiplying control to perform multiplication in orders determined by setting of said ordinal keys; substantially as specified.

2. In a calculating machine, in combination; a plurality of ordinal keys; power-driven calculating mechanism adapted to respond directly to actuation of said keys for performing addition; and means for performing multiplication, by permitting a predetermined number of actuations of said calculating mechanism in orders determined by setting of said ordinal keys; substantially as specified.

3. In a calculating machine, the combination of keys, a continuously moving member, prime actuators, means individually and automatically connecting said prime actuators to said moving member upon the pressing of the keys for adding, and a common multiplying control for said actuators in multiplying.

4. In a calculating machine, the combination of a continuously moving power member, prime actuators adapted to effect both addition and multiplication, ordinal keys for automatically and positively connecting said prime actuators with said member for adding, and a control for said prime actuators in multiplying.

5. In a calculating machine, the combination o fa continuously moving power member, prime actuators, ordinal keys for automatically and positively connecting said prime actuators with said member for adding, and means common to all said actuators for causing repeated action of selected prime actuators in multiplying.

6. In a calculating machine, the combination of accumulators having numeral wheels, prime actuators adapted to effect both addition and multiplication, a continuously moving power member, digital responsive means for positively connecting the prime actuators to said power member to thereby permit said power member through the prime actuators to actuate the accumulators, and a control for prime actuators in multiplying.

7. In a calculating machine, the combination of accumulators having numeral wheels, a continuously moving power member, column actuators adapted to be set in appropriate positions by key actuation, and means optionally operable for individually and immediately connecting said column actuators with said power member in adding or conjointly and simultaneously connecting a number of column actuators with said power member in multiplying.

8. In a calculating machine, the combination of accumulators having numeral wheels, a continuously moving power member, column actuators adapted to be set in appropriate positions by key actuation, and means optionally operable for positively connecting said column actuators with said power member in response to actuation of the keys to perform addition, or conjointly and simultaneously connecting a number of column actuators with said power member in multiplying.

9. In a calculating machine, the combination of accumulators having numeral wheels, a continuously moving power member, column actuators adapted to be set in appropriate positions by key actuation, and means optionally operable for positively connecting said column actuators with said power member in response to actuation of the keys to perform addition, and positively connecting a number of column actuators with said power member in multiplying.

10. In a calculating machine, the combination of accumualtors having numeral wheels, a continuously moving power member, column actuators adapted to be set in appropriate positions by key actuation, and means optionally operable for individually and immediately connecting said column actuators with said power member in adding or conjointly and simultaneously connecting a number of column actuators with said power member in multiplying, connection in either event between said column actuators and said continuously moving member being positive.

11. In a calculating machine, the combination of accumulators, ordinal keys, prime actuators therefor directly responsive to key-actuation to perform addition, a continuous motion device for coöperation with said prime actuators, and means for multiplying by maintaining throughout the multiplication the operating relations resulting from initial manipulation of the keys of the prime actuators.

12. In a calculating machine, the combination of reciprocating prime actuators, a continuous motion device, denominational keys, means operable by the denominational keys for moving said prime actuators into position for individual and immediate automatic calculating movement by said device, and means for controlling said movement of said prime actuators to produce repeated action thereof for multiplying.

13. In a calculating machine, the combination of keys, prime actuators having an inoperative stroke and an operative stroke, a continuously moving power member, and devices normally under key-control for connecting said prime actuators individually to said member prior to their operative strokes and a multiplying control for relieving said devices from the direct control of said keys.

14. In a calculating machine, calculating mechanism, and means for optionally operating said calculating mechanism as power-driven key-responsive mechanism and as key-set mechanism.

15. In a calculating machine, calculating mechanism, means for optionally operating said calculating mechanism as key-responsive mechanism and as key-set mechanism, and means for driving said mechanism in both operations.

16. The combination, in a unitary calculating machine, of keys, a power member, and calculating mechanism optionally driven by said power member in direct response to key-actuation, or operable as key-set calculating mechanism.

17. In a calculating machine, in combination, calculating mechanism adapted for power driven key-responsive action and for key-set action, and a controlling means therefor adapted to arrange said calculating mechanism for key-responsive action and key-set action.

18. In a calculating machine, the combination of prime actuators, keys, a continuously moving power member, positive connection between said keys and said prime actuators for immediately, individually and automatically connecting said prime actuators to said power member in adding, means for disconnecting said positive connection between said prime actuators and said keys whereby the keys determine merely the extent of calculating movement and not the time of actuation of said prime actuators, and independent means for controlling the time of actuation of said prime actuators.

19. In a calculating machine, the combination of prime actuators, keys, a continuously moving power member, positive connection between said keys and said prime actuators for immediately, individually and automatically connecting said prime actuators to said power member in adding, means for disconnecting said positive connection between said prime actuators and said keys whereby the keys determine merely the extent of calculating movement and not the time of actuation of said prime actuators, and independent means for controlling the time of actuation of said prime actuators for multiplying.

20. In a calculating machine, the combination of ordinal or digital keys, prime actuators, a continuously moving power device, multiplier keys and controlling devices acting independent of the multiplier keys to positively and immediately connect the prime actuators actuated in response to the denominational keys with the said member in adding and acting under the control of said multiplier keys to simultaneously connect the prime actuators of a multiplicand set up in the denominational keys in multiplying.

21. In a calculating machine, prime actuators adapted to effect addition or subtraction and multiplication or division, continuous motion devices for operating the prime actuators, selecting and controlling mechanisms, a plurality of orders or columns of denominational keys, an order of multiplier keys, and a shift member for changing the arrangement of the control from addition or subtraction to multiplication or division and vice versa.

22. In a calculating machine, prime actuators adapted to effect addition or subtraction and multiplication or division, continuous motion devices for operating the prime actuators, selecting and controlling mechanism, a plurality of orders or columns of denominational keys, an order of multiplier keys either of which may effect said control, and a shift member for changing the arrangement of the control from one to the other.

23. In a calculating machine, the combination of an accumulator, an accumulator actuator adapted to effect addition and multiplication, a series of denominational keys, a member having a differential movement in amount determined by the individual denominational key manipulated, connections between said actuator and said member and means maintaining such connection in positive engagement throughout adding and out of positive engagement in multiplying.

24. In a calculating machine, the combination of an accumulator, an accumulator actuator adapted to effect addition and multiplication, a series of denominational keys, a member having a differential movement in amount determined by the individual denominational key manipulated, connections between said actuator and said member, said member remaining independently of the keys in key arranged position throughout multiplying.

25. In a calculating machine, the combination of continuously moving power member, a plurality of sets of denominational adding mechanisms adapted for repeated actuations in multiplying and key-set prior to multiplying, and a multiplying mechanism arrangeable in key-set position prior to multiplying, and automatic devices for producing immediate concurrent action of said multiplying and adding mechanisms, said power member positively engaging both said mechanisms in their actuation.

26. In a multiplying calculating machine, the combination of a continuously driven power means, a plurality of sets of ordinal adding mechanisms adapted for repeated actuation in multiplying, keys for setting said mechanisms individually, and multiplier devices operable for positively and ordinally connecting the individually set adding mechanisms with said continuously driven power means, said adding mechanisms being maintained in their individual ordinal connection with said power means throughout the repeated movements that effect multiplication.

27. In a calculating machine, the combination of power means, a plurality of sets of adding mechanisms adapted for repeated actuation in multiplying, keys for setting said mechanisms individually, and multiplier devices operable for positively connecting said adding mechanisms with said power means, and means comprising members under common control for preventing said connection between said adding mechanism and said power means until all adding mechanisms desired are in proper arrangement.

28. In a calculating machine, the combination of power mechanism, segment levers adapted to be dropped into position for actuation by said power mechanism under individual and single key action, means for delaying the dropping of said singly and individually key manipulated levers, and a common release for said means.

29. In a calculating machine, the combination of accumulator mechanism, adding mechanism adapted for repeated actuation for multiplying, means for controlling the number of repeated actuations in multiplying, and a zeroizing mechanism for zeroizing the machine after a multiplying operation and operable during a multiplying operation without interfering with the movement of the several moving parts.

30. In a calculating machine, in combination; accumulators; column actuators the movements of which are controlled by key-actuation; a continuously-moving driving means common to all the column actuators; and means for multiplying by effecting, throughout multiplication, a positive and ordinally individual power connection between key-set column actuators and said continuously-moving driving means, said column actuators being maintained in their individual ordinal connection with said driving means throughout the repeated movements that effect multiplication; substantially as specified.

31. In a calculating machine, in combination; accumulators; column actuators; a continuously-moving driving means common to all the column actuators; and means for multiplying by effecting, throughout multiplication, a positive and ordinally individual power connection between column actuators and said continuously-moving driving means, said column actuators being maintained in their individual ordinal connection with said driving means throughout the repeated movements that effect multiplication; substantially as specified.

JOSEPH A. V. TURCK.